United States Patent [19]

Fier

[11] Patent Number: 4,761,823
[45] Date of Patent: Aug. 2, 1988

[54] COMMUNICATIONS ADAPTOR BRACKET

[75] Inventor: Duane T. Fier, Owatonna, Minn.

[73] Assignee: E. F. Johnson Company, Waseca, Minn.

[21] Appl. No.: 904,558

[22] Filed: Sep. 5, 1986

[51] Int. Cl.⁴ .............................................. H04B 1/38
[52] U.S. Cl. ....................................... 455/89; 455/90; 455/99; 455/346; 455/348; 455/349
[58] Field of Search ...................... 455/89, 90, 99, 345, 455/346, 348, 349

[56] References Cited

U.S. PATENT DOCUMENTS

| | | | |
|---|---|---|---|
| 3,917,372 | 11/1975 | Selinko | 455/346 |
| 3,946,390 | 3/1976 | Alexander et al. | 455/89 |
| 4,050,767 | 9/1977 | Berniny | 455/346 |
| 4,194,157 | 3/1980 | Uno | 455/348 |
| 4,418,426 | 11/1983 | Singletary | 455/343 |
| 4,627,107 | 12/1986 | Hohlfeld et al. | 455/346 |

Primary Examiner—Michael A. Masinick
Attorney, Agent, or Firm—Dorsey & Whitney

[57] ABSTRACT

A method and apparatus for adapting a portable radio transceiver (10) for configuration in electronic communication with a main console of a fixed or mobile communication system. The apparatus employs a bracket (36) which serves to extend, by cables 52, 54, various functional input terminals at the console to function contacts (44, 46) at the bracket (36). The transceiver (10) includes apparatus (34) for mating the transceiver (10) to the bracket (36). The bracket (36) carries a track (50) for accepting the track rider mating apparatus (34) of the transceiver (10).

13 Claims, 1 Drawing Sheet

U.S. Patent    Aug. 2, 1988    4,761,823
Fig. 1
Fig. 2
Fig. 3
Fig. 4
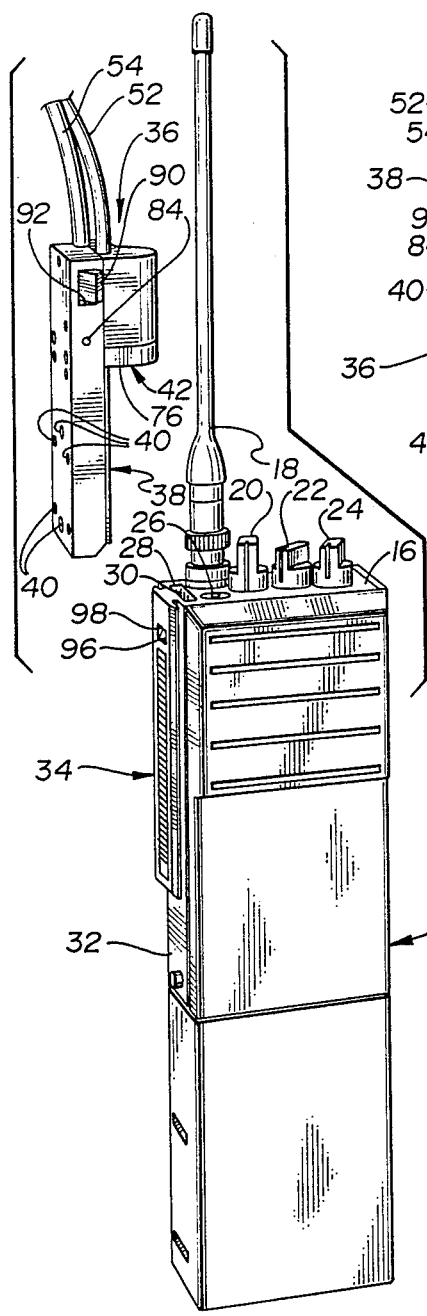
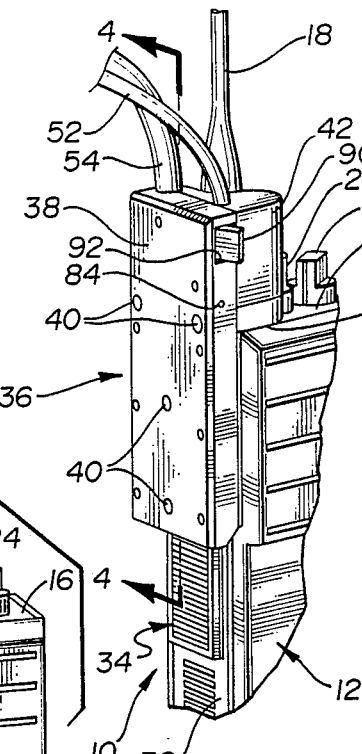
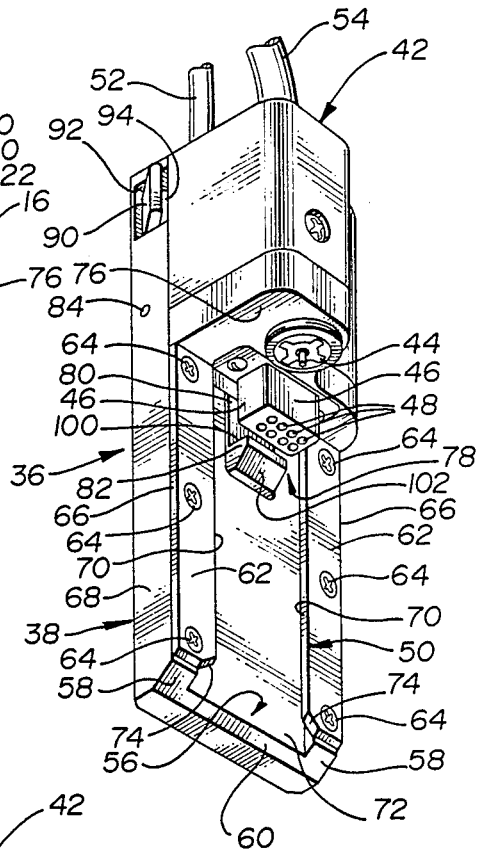
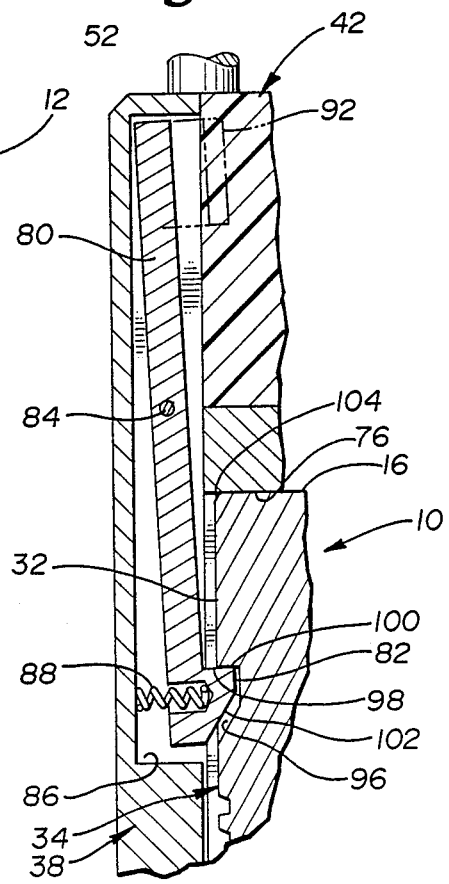

COMMUNICATIONS ADAPTOR BRACKET

TECHNICAL FIELD

The present invention is related broadly to the field of communications. More narrowly, however, it deals with the art of adapting a portable transceiver and the main console of a fixed or mobile communications system so that the transceiver can draw from the console for its various functions such as audio, logic, power, charging, and RF. In a preferred embodiment, the invention deals with making such an adaption so that the transceiver can be maintained either proximate to, or remote from, the console from which it will draw its functional inputs.

BACKGROUND OF THE INVENTION

The importance of communications, particularly in today's fast-paced society in which virtually instantaneous decision making must be implemented cannot be overemphasized. Fast and accurate transmission of data and other information is virtually essential to the conducting of business. Such is true regardless of whether the business is as sophisticated as international finance or as mundane as taxi cab operations.

In the latter endeavor, various types of communications equipments might be utilized. An example of a typical communications package used is one which employs a console fixed within the taxicab vehicle (for example, suspended from the underside of the dashboard). A microphone is "hard wired" to the console, and the console includes a speaker so that incoming communications can be received, converted to audible sound, and heard within the vehicle. Typically, such a communications package employs an antenna mounted to the vehicle externally and connected to the console by appropriate cable.

A unit of this type is to be contrasted from a unit fixed, for example, within a building in that it has a significant measure of mobility. It is, however, limited in that it can go only where the vehicle in which it is mounted can go.

As such a mobile unit is distinguished from a fixed communications unit, a third type of system is, in turn, distinguishable from such a mobile system. This third system is appropriately characterized as being "portable" or "transportable". Such equipments are informally referred to as walkie-talkies. They are self-contained units that can be carried by their operators. They include their own power supplies and other functional feature components. Because of their portability, distinct advantages can be obtained over merely "mobile" systems.

In the case of taxi cab usage, it will be seen that a portable system enables the driver to leave his vehicle and still be able to transmit messages to, and receive messages from, a dispatcher. One can imagine numerous instances when time is of the essence and immediate receipt of a message by a cab driver would be advantageous, if not critical.

As will be understood, however, portable systems typically have a number of draw backs over a fixed or mobile system. Their power supplies are more limited in capacity and tend to drain relatively quickly. Additionally, the number of channels and frequencies available to the users of portable systems are more limited than in the case of fixed or mobile systems. Other factors bear upon the power, efficiency, and, commensurately, the desirability of a portable system as compared to a mobile system.

As can be seen, therefore, it might be appropriate both to maintain a "mobile" unit fixed within a vehicle and carry a "portable" unit. Each of the units would be able to be employed, depending upon the circumstances of use.

Having two complete transceiver units involves some duplicity of structure. As will be able to be seen in view of this disclosure, one might consider utilizing a portable transceiver in combination with the main console of the "mobile" unit. By doing so, the life of the power supply of the portable unit could be extended beyond that which would otherwise be able to be expected, and other advantages could be obtained. By configuring the portable transceiver to be used in combination with the main console of the mobile unit, other functions of the mobile system could also be drawn upon. For example, the greater frequency ranges available with the mobile unit could be implemented for use with the portable transceiver.

At the same time, however, if the portable transceiver were able to be quickly disconnected, it could be carried by the vehicle's operator to locations remote from the vehicle. The best of both worlds could, thereby, be obtained.

It is to the problems in the prior art and the desirable features dictated by the prior art that the present invention is directed. It encompasses both an apparatus and method for adapting a portable transceiver so that it can be configured in electronic communication with the main console of a fixed or mobile communications system. Consequently, when so configured, the portable transceiver can draw on the various functions provided by the console. At the same time, however, it can be positioned at various locations within the vehicle even when so configured, and can be disconnected for use as a truly portable communications system.

SUMMARY OF THE INVENTION

The invention of the present document is an apparatus and method for adapting a radio transceiver, employing various functions such as audio, logic, power, charging, and RF, for use with the console of a fixed or mobile system so that it can draw on the console for those functional inputs. The console would, of course, be of a type to provide the various functions necessary for the portable unit. The invention includes the transceiver, the transceiver having a plurality of externally accessible contacts. Each of these contacts would correspond to one of the functions previously discussed. A bracket, carrying a corresponding plurality of contacts, is also employed. Each contact carried by the bracket corresponds to one of the functional inputs to be drawn from the console by the portable transceiver. The bracket is configured so that each of its contacts taps off a source of its respective functional input at the console. Means are provided for detachably mating the transceiver to the bracket with the contacts of the transceiver coupled with corresponding contacts at the bracket. The bracket is disposed so that, even while it is moved within a vehicle housing the communication systems to vrious locations both proximate and remote from the console, the functions at the console are still provided to the bracket.

In a preferred embodiment, the connections between the bracket and the console can comprise two separate cables. A coaxial cable can be employed for providing the transmission path for the RF function from the console to the bracket. A multi-function transmission cable can be utilized to connect the console and a plurality of other functional input contacts at the bracket, each of these other functional input contacts representing functions other than RF. The coaxial cable for the RF functional input and the multi-function transmission cable for the other functions can be of similar lengths in order to facilitate positioning and dispositioning of the bracket within the vehicle with which it is to be utilized.

In the preferred embodiment, means can be provided to lock the portable transceiver to the bracket when it is mated therewith. To this end, the bracket can be provided with a track having an entrance end and a home end. The transceiver can be adapted, if necessary, to include a track rider for insertion into the entrance end and movement toward the home end. Corresponding contacts on the transceiver and the bracket can be disposed so that, when the track rider attains the home end position of the track, respective contacts will couple together.

A latch can be employed to hold the transceiver in position relative to the bracket wherein respective contacts are coupled. The latch can be biased to an extended position wherein it is received within a recess in the transceiver so that an axially facing shoulder defined by the latch is engaged by a shoulder of the recess facing in a direction opposite that in which the latch shoulder faces. Inadvertent retraction of the transceiver from the bracket can, thereby, be precluded.

The present invention is thus an improved apparatus and method for adapting a portable radio transceiver for configuration in electronic communication with a main console of a fixed or mobile communications system, wherein the portable transceiver can draw on various functions provided by the console. More specific features and advantages obtained in view of those features will become apparent with reference to the DETAILED DESCRIPTION OF THE INVENTION, appended claims, and accompanying drawing figures.

BRIEF DESCRIPTION OF THE DRAWINGS

FIG. 1 is an exploded view, in perspective, illustrating a portable transceiver in accordance with the present invention and a bracket to which it is to be mated;

FIG. 2 is an enlarged perspective view illustrating the transceiver as mated to the bracket;

FIG. 3 is an enlarged perspective view illustrating the bracket in more detail; and FIG. 4 is a side sectional view of a portion of the transceiver illustrated in FIGS. 1 and 2 showing a locking mechanism.

DETAILED DESCRIPTION OF THE INVENTION

Referring now to the drawing wherein like reference numerals denote like elements throughout the several views, FIG. 1 shows a portable transceiver 10, typical of a type known in the prior art with the exception of some minor adaptations as will be discussed hereinafter. The transceiver 10 includes a housing 12 in which the electronics and acoustical components are encased. The housing 12, as constructed in accordance with a prior art device, can have a number of slits 14, or a series of holes, formed therein to function as acoustical baffles both during transmission and for speaker sound presentation.

An upper wall 16 of the housing 12 is shown as mounting, in addition to an antenna 18, a number of control knobs 20, 22, 24. These knobs can be used to regulate on-off/volume, squelch, and selection of channel.

In accordance with the invention, the transceiver housing 12 can be adapted to provide an RF female jack receptacle 26. Additionally, a recess 28, encircling contact pins 30 for other transceiver functions can also be provided. These other functions can include audio, logic, power, and charging. It will be understood, of course, that other functions might be applicable, and additional pins 30 would be provided for other functions not specifically enumerated herein.

A left sidewall 32 is, further, adapted, in accordance with the invention, to provide a track follower 34 to facilitate mating of the transceiver 10 to a bracket 36. The function and the operation of the track follower 34 will be discussed in more depth hereinafter.

The bracket 36 is a remotely positionable extension of functional input terminals at the main console (not shown) of a mobile communication system mounted, for example, in a taxi cab. The bracket 36 will now be discussed in more detail with reference to FIGS. 1, 2, and 3 of the drawing.

The bracket 36 includes a base mounting plate 38. The plate 38 can be provided with apertures 40 for securing the bracket 36 within the vehicle in which it is to be used. It will be understood, however, that the bracket 36 need not be so mounted and can be lain at any location within the vehicle (for example, under the driver's seat).

A block 42 is secured to the base 38 and extends laterally therefrom. The block 42 mounts, as best seen in FIG. 3, an RF center tap male contact prong 44. Similarly, a female, pin receptacle 46 extends from the block 42 in the same direction as does the RF contact prong 44. The receptacle 46 is shown as having eight pin reception apertures 48 formed therein. It will be understood, however, that any number of such apertures 48 can be provided. The number will be dictated, of course, by the number of functions the transceiver 10 is to draw from the main console of the mobile communications unit.

As seen in the Figures, the block 42 is disposed on a side of the base plate 38 at one end thereof. The RF male contact prong 44 and the female, pin receptacle 46 extend from the block 42 in a direction toward the end of the base plate 38 opposite that at which the block 42 is mounted thereto. Consequently, they can be coextensive, along an axis of elongation of the bracket 36, with a track 50 which can be used to facilitate mating of the transceiver 10 and the bracket 36. Such mating will be discussed in more detail hereinafter.

As seen in FIGS. 1-3, the bracket 36 has a pair of cables 52, 54 extending from the console (not shown) to the bracket block 42. A coaxial cable 52 is, it is intended, utilized to extend the RF function from the console to the center tap male contact prong 44. Similarly, a multi-function transmissin cable 54 extends the other functions from the console to the bracket block 42 and, in turn, to the female, pin receptacle 46 extending therefrom. As will be able to be seen in view of this disclosure, therefore, the functions provided by the main console of the mobile communications system can be tapped off the console and be extended to the bracket 36.

A generally U-shaped channel 56 is shown in FIG. 3 as being formed in the side of the base plate 38 to which the bracket block 42 is mounted. The channel 56 is rather shallow in depth, the legs 58 of the U extending from the base leg 60 only a small distance. A plate 62 is shown as being secured to each of the U legs 58. Securing can be effected in any appropriate fashion as, for example, by Phillips-head screws 64, as shown in FIG. 3.

Each plate 62 is shown as being flush, along one edge 66 thereof, with outer edges 68 of the base plate 38. An opposite edge 70 of each plate 62 extends, however, over a portion of the channel 56 defined between the U legs 58. A generally T-shaped track 50 is, thereby, defined, each of the plates 62 forming one rail of the track. It will be understood that plates 62, base plate 38, Phillips-head screws 64, and bracket block 42 may be integrally formed in future production in order to cut down piece parts and improve strength.

FIG. 1 in particular illustrates a track rider 34 of a type which is specifically contemplated by the invention. The track rider 34 is generally T-shaped in cross section, and is sized and shaped similarly to the cross section of the track 50 defined by the U-shaped channel 56 in the base plate 38 and the plates 62 secured to the U legs 58.

The rider 34 is elongated along an axis and can, thereby, be inserted into an entry end 72 of the track 50 at an end of the bracket 36 opposite that at which the block 42 is mounted. Corners of the plates can be beveled as at 74 to facilitate insertion of the track rider 34.

The rider 34 can, thereafter, be slid along the track 50 until the upper wall 16 of the transceiver housing 12 approaches engagement with an underside 76 of the bracket block 42. The invention contemplates positioning of the RF center tap male contact prong 44 and the female, contact pin receptacle 46 such that they will be in positions aligned with the RF female, jack receptacle 26 and the recess 28 in the upper wall 16 of the transceiver housing 12 containing the pins 38 for functions other than RF, respectively, in the upper wall 16 of the transceiver 12.

As the track rider 34 is urged to a "home" end 78 of the track 50, therefore, the center tap contact prong 44 carried by the bracket block 42 will couple with the female, jack receptacle 26 in the transceiver 10. Similarly, the pins 30 received within the recess 28 in the transceiver 10 will enter the apertures 48 in the female, contact pin receptacle 46, and coupling of these respective components will be effected to accomplish completion of operative transmission paths for the respective functions between the main console and the transceiver 10.

In order to facilitate maintenance of the transceiver 10 in operative relationship to the bracket 36, locking means can be provided. FIG. 4 illustrates a latch lever 80 mounting a latch 82 at one of opposite ends thereof. The lever 80 and latch 82 are mounted within the base plate 38 of the bracket 36 and are disposed for pivoting about a pin 84 to which the lever 80 is mounted. The latch 82 is carried by the lever 80 at the lower end thereof, and the lever 80 is biased so that the latch 82 is urged to an extended position protruding from a cavity 86 in the base plate 38 of the bracket 36 in which the lever 80 and latch 82 are received. A coil spring 88 can be employed for this purpose.

FIGS. 1, 2 and 3 illustrate an unlatch lever tab 90. The tab 90 extends through a window 92 in the base plate 38 at an end thereof coextensive with the block 42. The tab 90 is pivotally mounted and includes an inwardly extending protrusion 94 which engages an end of the latch lever 80 opposite that carrying the latch 82 to overcome the biasing of the coil spring 88 and retract the latch 82.

A recess 96 is formed in the track rider 34, the recess 96 defining a shoulder 98 facing in an axial direction opposite a shoulder 100 defined by the latch 82. The recess 96 is positioned in the track rider 34 so that, when the upper wall 16 of the transceiver 12 is substantially in engagement with an underside 76 of the bracket block 42, the latch 82 will be in position so these shoulders 98, 100 can engage to preclude separation of the transceiver 10 from the bracket 36.

A side of the latch 82 facing in a direction opposite that in which the shoulder 100 defined thereby faces can be provided with a ramped cam surface 102. When the track rider 34 is being inserted into the track 50 of the bracket 36 and the transceiver 10 urged relative to the bracket 36 toward a mated position, the upper wall 16 of the transceiver 10 at the track rider 34 will engage this ramped cam surface 102 to urge the latch 82 to its retracted position. As seen in FIG. 4, the corner of the upper wall of the transceiver can be chamferred as at 104 to facilitate smooth operation of the latching mechanism. When the latch 82 achieves a position in registration with the recess 96 in the track rider 34, the latch 82 will enter the recess 96.

As can be seen, an apparatus as discussed hereinbefore will not only enable a portable radio transceiver 10 to be interfaced with the main console of a mobile communications system, but it will also permit the mated transceiver 10 and bracket 36 to be mounted at various locations within the vehicle in which the device is to be used. Those locations can be both proximate and remote from the console. Considerable flexibility is, thereby, provided.

The manner of practicing the method invention will be apparent in view of the description of the apparatus invention. The various functions are extended from corresponding terminals at the console to the RF center tap male contact prong 44 contact and female, contact pin receptacle 46 at the bracket block 42 by the coaxial cable 52 and multi-function cable 54.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. Apparatus for adapting a portable radio transceiver for configuration in electronic communication with a main console of a fixed or mobile communication system, wherein said portable transceiver includes electronic and acoustical components and selection means for controlling said components encased in a generally rectangular housing and wherein said portable transceiver can draw on various functions provided by said main console and is provided with externally accessible contacts for connecting various functional signals, such as audio, logic, power, charging, and RF, with said main console, comprising:

a bracket including:

a bracket base for operably engaging a side wall of said housing;

a connector block extending laterally from said bracket base for operably engaging an end wall of said housing and having various contacts corresponding to the functional signals to be connected with said externally accessible contacts with which said portable transceiver is provided, each of said contacts of said bracket connected to its respective functional signal at said main console;

means for detachably mating said portable transceiver to said bracket with said externally accessible contacts of said portable transceiver coupled with said corresponding contacts of said bracket; and means for permitting disposition of said bracket at locations both proximate and remote from the console, whereby when said bracket is mated with said portable transceiver, said externally accessible contacts of said portable transceiver are coupled with said corresponding contacts of said bracket and said portable transceiver may still be used as a hand-held device.

2. Apparatus in accordance with claim 1 wherein said mating means comprises:

a track having
an entrance end and a home end, carried by said bracket base; and
track riding means, compatible with said track, carried by said portable transceiver,
wherein, as said track riding means is made to enter said entrance end of said track and urged toward said home end, said externally accessible contacts with which said portable transceiver is provided approach engagement with said corresponding contacts of said bracket, and, as said track riding means arrives at said home end, said externally accessible contacts engage said corresponding contacts of said bracket.

3. Apparatus in accordance with claim 2 further comprising means for locking said portable transceiver to said bracket with said track riding means at said home end of said track.

4. Apparatus in accordance with claim 3 wherein said track riding means has an axially facing first shoulder associated therewith, and wherein said locking means comprises a latch, carried by said bracket, moveable between retracted and extended positions, said latch, when in its extended position, being able to engage, when said track riding means is within said track and at said home end thereof, said shoulder to preclude unmating of said portable transceiver from said bracket.

5. Apparatus in accordance with claim 4 further comprising means for biasing said latch to said extended position.

6. Apparatus in accordance with claim 5 wherein said biasing means comprises a coil spring.

7. Apparatus in accordance with claim 5 wherein said latch defines a second shoulder, facing axially in a direction opposite that in which said first shoulder faces, which engages said first shoulder to preclude unmating of said portable transceiver from said bracket, and wherein said latch defines a cam surface, facing in a direction opposite that in which said second shoulder faces, which is engaged by said track riding means and urges said latch to said retracted position as said track riding means is made to enter said entrance end of said track and approaches said home end thereof.

8. Apparatus in accordance with claim 1 wherein a separate bracket contact for the RF functional input, isolated from the other of said bracket contacts, is provided, and wherein said permitting means comprises:

(a) a length of coaxial cable, interconnecting the console and said bracket contact for the RF functional input, to provide electronic communication therebetween; and (b) a multifunction transmission cable of a length similar to that of said coaxial cable, interconnecting the console and a gang of the other of said bracket contacts, to provide electronic communication therebetween.

9. Apparatus for adapting a single portable radio transceiver for configuration in electronic communication with a main console of a fixed or mobile communication system, wherein said portable transceiver includes electronic and acoustical components, selection means for controlling said components and a plurality of externally accessible contacts for connecting various functional signals, such as audio, logic, power, charging, and RF, with said main console, all of which are housed in a generally rectangular housing having a side wall and an end wall, comprising:

bracket means for providing an electro-mechanical interface between said portable transceiver and said main console, including:
a generally rectangular bracket plate presenting a surface for operably engaging said side wall of said portable transceiver and having an upper end and a lower end;
a connector block shoulder means extending axially outward from said upper end of said surface of said bracket plate having a lower surface for operably engaging said end wall of said portable transceiver; and
a plurality of externally accessible contact elements on said lower surface of said connector means corresponding to the functional signals to be connected with said externally accessible contacts of said portable transceiver;

mating means for detachably mating said portable transceiver to said bracket means;

locking means for cooperating with said mating means and selectably locking said portable transceiver to said bracket means with said externally accessible contact elements of said bracket means operably engaged with said externally accessible contacts of said portable transceiver; and cable means for connecting said bracket means to said main console, thereby permitting the disposition of said bracket means at locations both proximate and remote from said main console;

whereby when said bracket means is mated with said portable transceiver, said externally accessible contact elements of said bracket means are operably engaged with said externally accessible contacts of said portable transceiver connecting said various functional signals with said main console, while not intefering with the operation of said portable transceiver as a hand-held device or with the operation of said selection means of said portable transceiver.

10. Apparatus in accordance with claim 9 wherein said mating means comprises:

track means on said surface of said bracket plate having an entrance end at said lower end of said bracket plate and a home end as said upper end of said bracket plate; and track riding means on said side wall of said portable transceiver, compatible with said track, wherein, as said track riding means is made to enter said entrance end of said track means and urged toward said home end, said externally accessible contacts of said portable transceiver approach engagement with said corresponding contact elements of said connector means, and, as said track riding means arrives at said home end, said externally accessible contacts engage said corresponding contacts elements.

11. Apparatus in accordance with claim 10 wherein said track means comprises a generally U-shaped channel and said track riding means comprises a generally T shaped ridge.

12. Apparatus for housing a portable radio transceiver to be adapted for configuration in electronic communication with a main console of a fixed or mobile communication system through a communications adaptor bracket having a track means and extenrally accessible contact elements in accordance with the present invention, wherein said portable transceiver includes electronic and acoustical components, and selection means for controlling said components, comprising:

a generally rectangular housing having a side wall and an end wall;

track riding means on said side wall compatible with said track means of said bracket; and a plurality of externally accessible contacts on said end wall for connecting various functional signals, such as audio, logic, power, charging, and RF, with said main console, whereby when said track riding means is mated with said track means of said bracket, said externally accessible contact elements of said bracket are operably engaged with said externally accessible contacts of said portable transceiver connecting said various functional signals with said main console, while not interfering with the operation said portable transceiver as a handheld device or with the operation of said selection means of said portable transceiver.

13. An apparatus in accordance with claim 12 further comprising:

locking means for cooperating with said bracket to selectably lock said housing to said bracket when said externally accessible contact elements of said bracket are operably engaged with said externally accessible contacts of said portable transceiver.

* * * * *